United States Patent
Lowe

[19]

[11] Patent Number: 5,874,891
[45] Date of Patent: Feb. 23, 1999

[54] ALARM SYSTEM FOR USE ON A BUS

[75] Inventor: Allan Lowe, Cumberland, Canada

[73] Assignee: Child Check-Mate Systems, Inc., Navan, Canada

[21] Appl. No.: 861,627

[22] Filed: May 22, 1997

[51] Int. Cl.$^6$ .................................................. B60Q 1/26
[52] U.S. Cl. ...................................... 340/433; 340/457
[58] Field of Search ............................. 340/425.5, 426, 340/430, 433, 436, 457; 180/167; 307/10.1

[56] References Cited

U.S. PATENT DOCUMENTS

| | | | |
|---|---|---|---|
| 3,838,392 | 9/1974 | Lockwood et al. | 340/433 |
| 4,123,745 | 10/1978 | Gurgone | 340/430 |
| 4,802,350 | 2/1989 | Periou | 70/264 |
| 5,128,651 | 7/1992 | Heckart | 340/433 |
| 5,243,323 | 9/1993 | Rogers | 340/433 |
| 5,281,949 | 1/1994 | Durley et al. | 340/433 |

FOREIGN PATENT DOCUMENTS 1319965  7/1993  Canada .............................. G07C 1/04

*Primary Examiner*—Jeffery A. Hofsass
*Assistant Examiner*—Van T. Trien
*Attorney, Agent, or Firm*—Faegre & Benson LLP

[57] ABSTRACT

There is provided a new and useful alarm system for use on a school bus having an ignition switch, a master switch, a rear door switch, the alarm system comprises a plurality of electromechanical circuits arranged so as to effect a resting state in which the system is inoperable, a stand-by state activated by actuating the ignition switch, a latching state from which the system may be armed, an armed state in which the system is operable, alarm means to indicate an alarm state, and a disarmed state in which the system is deactivated. There is also provided deactivation means positioned at a rear of the bus to deactivate the alarm system while in the armed state or the alarm state, wherein the alarm system is integral with the ignition switch, the master switch and the door switch of the bus.

14 Claims, 7 Drawing Sheets

ALARM SYSTEM FOR USE ON A BUS

FIELD OF THE INVENTION

This invention relates to an alarm system for use on a bus to remind the driver of the bus to conduct an inspection of the inside of the bus.

BACKGROUND OF THE INVENTION

In order to ensure that no children are left on a bus, such as a school bus, drivers are trained to walk to the back of the bus to look for children who may still be on the bus before locking it up at the end of a run. This can be done at the school bus yard, or en route to the yard, so long as it is done at a time when the driver believes that all of the children are off of the bus. It can even be done while the bus is running. For example, if the driver wished to pull off on the side of the road on the way to the yard and do the check at that point, the requirement would be met. The timing or location of the check is not crucial, so long as the check is done.

However, driving a school bus is a demanding task and at the end of a shift, the driver is often tired and anxious to get home. Thus, even the best drivers can sometimes forget to perform the crucial check for children left on the bus. In those unlikely circumstances, the trauma suffered by a child that was left on the bus after the bus has been parked at the school bus yard and locked up for the night would be immeasurable. The bus company would likely then face negligence lawsuits from the child's parents and the driver would more than likely be fired.

There thus exists a need for a system on the bus to remind the driver to walk to the back of the bus to perform the check. An audible or visual alarm system which sounds when the bus ignition is turned off would be sufficient, as long as it required the driver to walk to the back of the bus to deactivate the system. In consultation with bus drivers, however, it was found that it is not necessary to have a system which could only be deactivated when the alarm was actually sounding. Such a system would not permit the driver to perform the check at any point along the route with the ignition running. It was also found that the bus owners desired a system which could be tied in with the existing wiring of the bus to eliminate the need for time-consuming and costly modifications to the bus.

Another pressing concern to school bus operators in particular is to ensure that the rear door and any other emergency exits of the vehicle are in proper working condition. A recent coroner's inquest into the death of children trapped in a burning in the Province of Ontario found that the deaths were attributable in part to the fact that the rear door of the bus could not be opened. Consequently, one of the recommendations from the inquest was to require a regular inspection of the rear door of the bus. Of course, such an inspection requires the driver to walk to the back of the bus and manually operate the door. This is a third aspect of the existing need for safety systems on buses.

Attempts in the prior art to design such a system have failed on the two key points outlined above and would not satisfy the third aspect of the rear door inspection. Reference may be had for example to U.S. Pat. No. 5,128,651 of Heckart, issued Jul. 7, 1992, and U.S. Pat. No. 5,243,323 of Rogers, issued Sep. 7, 1993. Neither of these references provides a means to deactivate the system with the ignition running and Heckart in particular would require significant modifications to the existing wiring of the bus to be installed. Rogers is similarly deficient in that it is only activated by the ignition switch and not any of the other switches or existing systems on the bus.

SUMMARY OF THE INVENTION

It is thus an object of the present invention to provide an alarm system for use on a bus to remind the driver of the bus to conduct an inspection of the inside of the bus to check for passengers remaining on the bus, which system could be tied in with the existing wiring of the bus. It is a further object of the present invention to provide a system which would remind the driver to perform the inspection of the rear door and facilitate that inspection.

In one aspect of the invention, there is provided an alarm system for use on a bus having an ignition switch, a master switch, a rear door switch, the alarm system comprises a plurality of electromechanical circuits arranged so as to effect a resting state in which the system is inoperable, a stand-by state activated by actuating the ignition switch, a latching state from which the system may be armed, an armed state in which the system is operable, alarm means to indicate an alarm state, and a disarmed state in which the system is deactivated. There is also provided deactivation means positioned at a rear of the bus to deactivate the alarm system while in the armed state or the alarm state, wherein the alarm system is integral with the ignition switch, the master switch and the door switch of the bus.

In another aspect of the invention, the deactivation means comprises the existing rear door switch of the bus.

In another aspect of the invention, there is provided a first, second and third electromechanical circuit to effect the resting state, the stand-by state, the latching state, the armed state, the alarm state and the deactivated state.

In a preferred embodiment of the invention, there is provided an alarm system in which all of the electromechanical circuits are deactivated in the resting state, the first electromechanical circuit is activated in the stand-by state, the first and second electromechanical circuits are activated in the latching state and armed state, the second electromechanical circuit is activated in the alarm state and the third electromechanical circuit is activated in the deactivated state.

BRIEF DESCRIPTION OF THE DRAWINGS

These and other advantages of the invention will become apparent upon reading the following detailed description and upon referring to the drawings in which.

Figure 1:
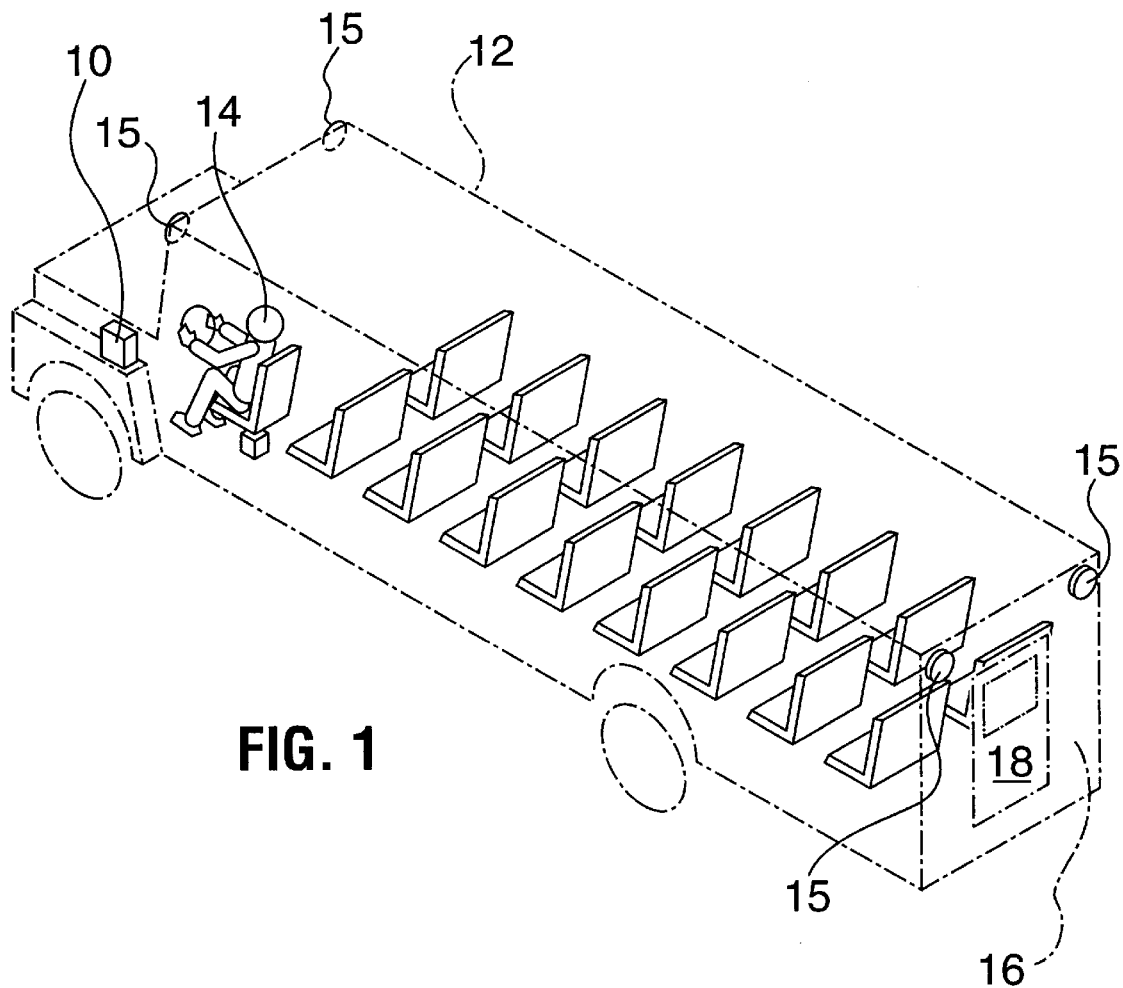
FIG. 1 is a schematic view of a school bus having the alarm system of the present invention installed therein.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, FIG. 1 illustrates an alarm system 10 for use on a bus 12 (such as a school bus as depicted in FIG. 1) to remind the driver 14 of the bus 12 to go to the rear 16 of the bus 12 to check for passengers (not shown) remaining on the bus 12. The system 10 is intended to work with the existing wiring of the bus 12, and to cooperate with the rear door 18 of the bus 12 when in use. The system could work with smaller buses in which there is only the rear door 18 as the emergency exit. Alternatively, in larger vehicles or buses in which there are emergency exits (not shown) in between the from and rear doors, the system could be incorporated into the wiring of those exits to cooperate with the operation of those exits.

FIGS. 2 through 7 represent circuit diagrams of the various states of the system 10. The structure and operation of the system 10 will be described in greater detail in reference to these circuit diagrams. Generally, in each of FIGS. 2 to 7, it can be seen that the system 12 is tied in with the ignition switch 20, light activating switch 22 and rear door switch 24 of the bus 12. The system 10 generally comprises three electromechanical circuit elements, depicted in the drawings as relays 26, 28, 30. In addition, there are diodes 32, 34 as part of the circuitry of the system and a fuse 36, typically in the order of 3 amperes.

Figure 2:
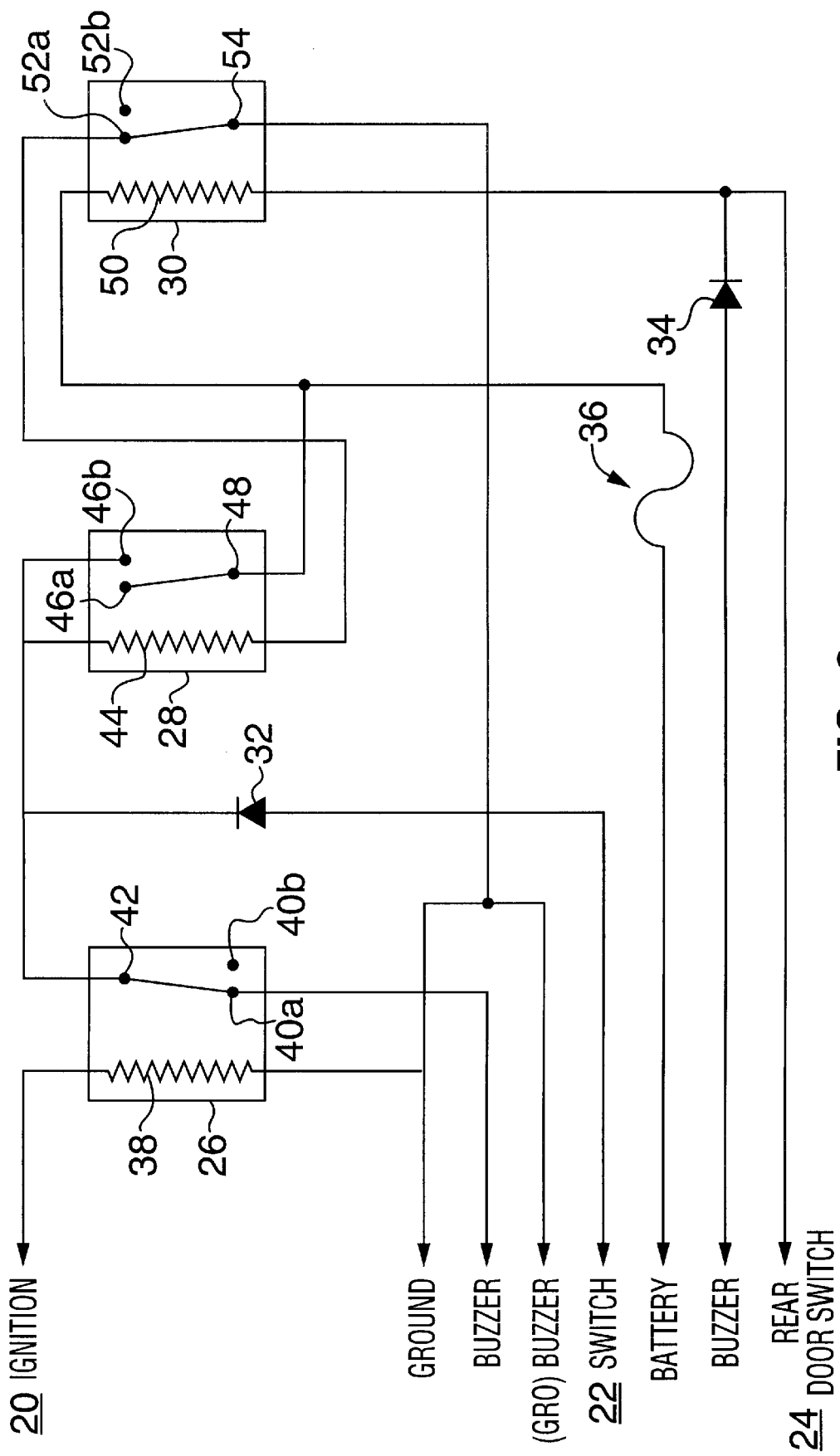
FIG. 2 is a schematic diagram of the alarm system circuitry of the present invention in the resting state.

FIG. 2 represents the resting state of the system 10, in which all power is off. In this state, there is no current flow through coil 38 and points remain closed between 40a and 42 of relay 26, there is no current flow through coil 44 and points remain open between 46b and 48 of relay 28, and there is no current flow through coil 50 and points remain closed between 52a and 54 of relay 30.

Figure 3:
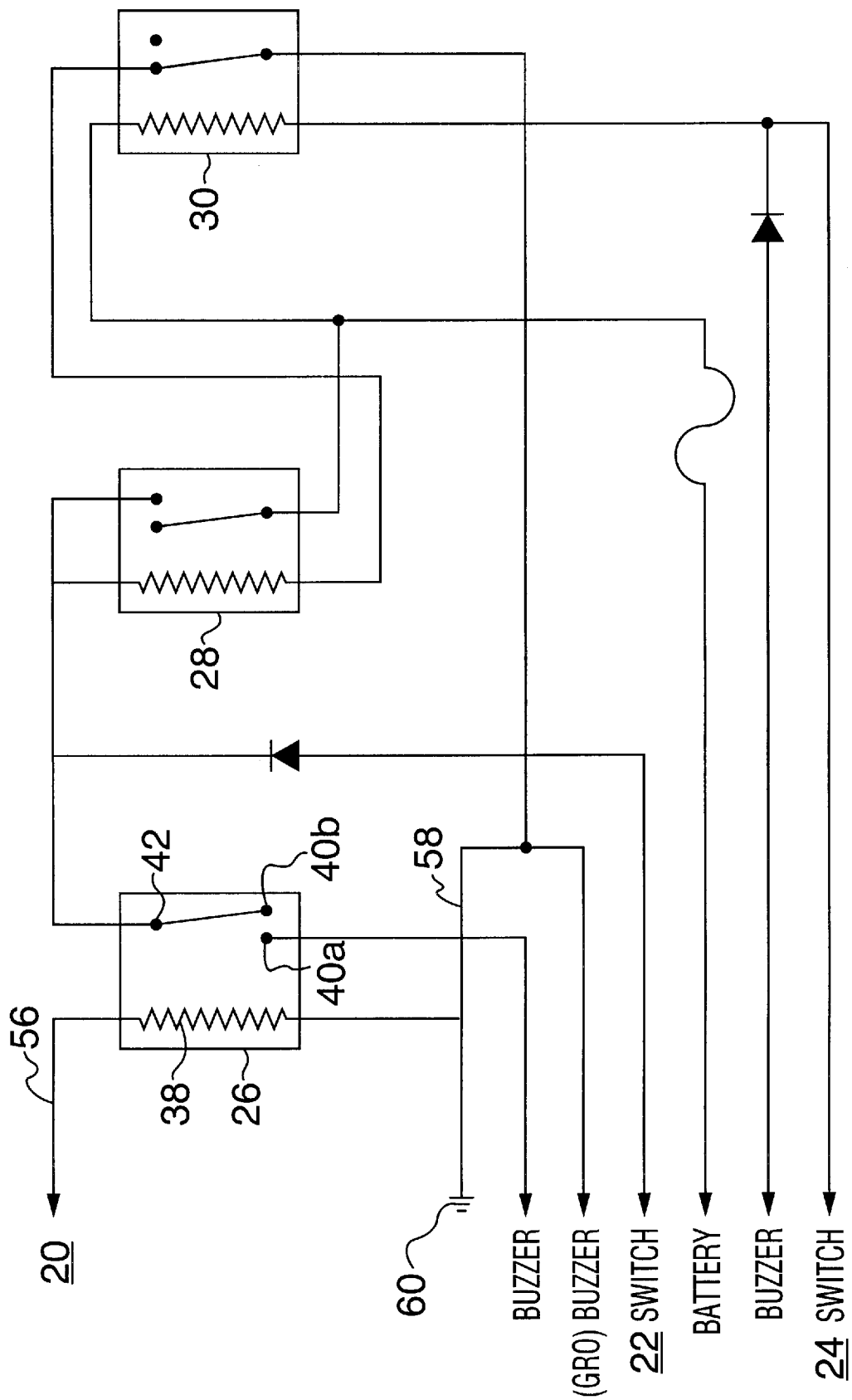
FIG. 3 is a schematic diagram of the alarm system circuitry of the present invention in the stand-by state.
Figure 4:
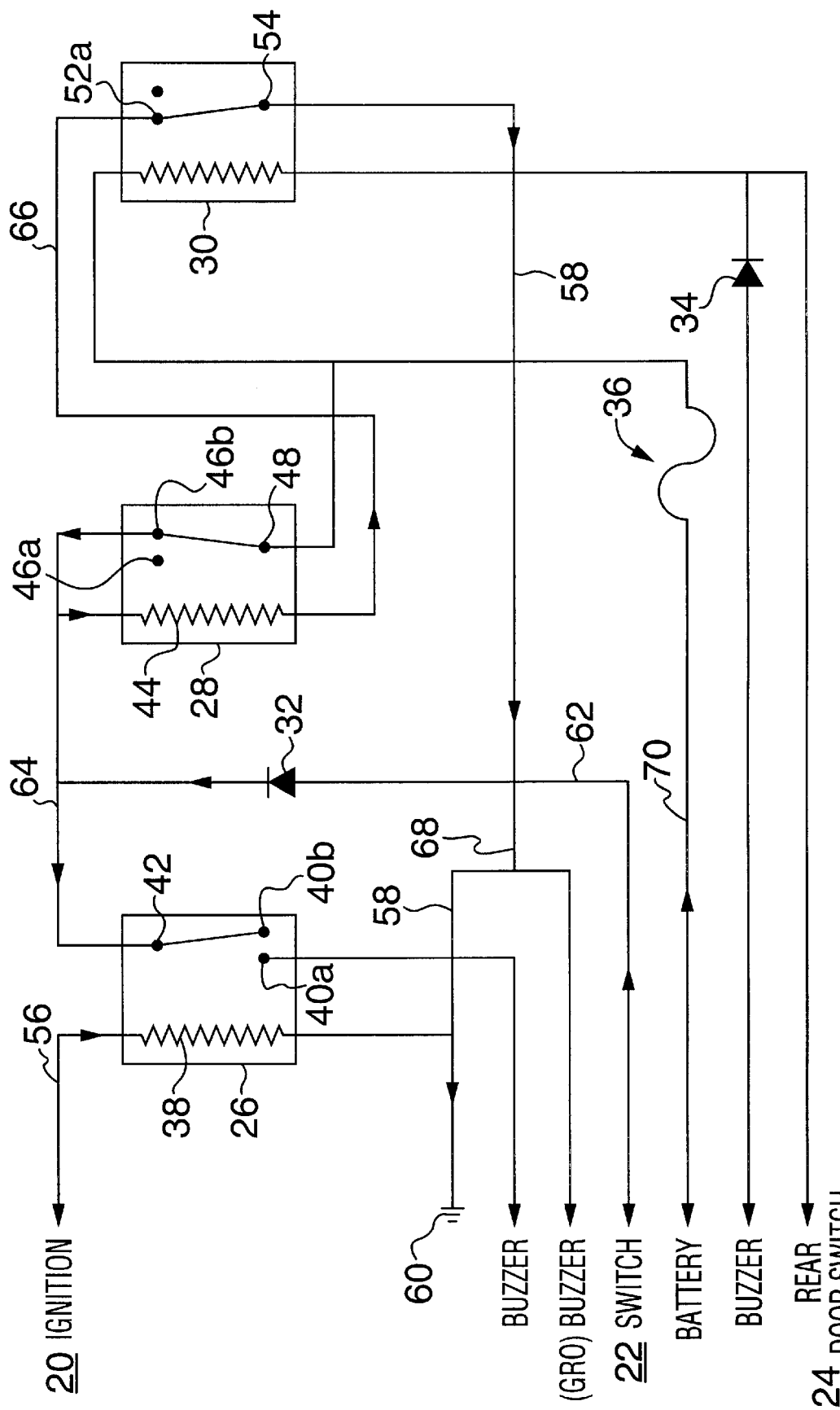
FIG. 4 is a schematic diagram of the alarm system circuitry of the present invention in the latching state.

When the ignition 20 of the bus 12 is turned on, the system 10 goes into stand-by state as depicted in FIG. 3. In this state, current flows through wire 56, through coil 38 to wire 58 and to ground 60. The points now open between 40a and 42. Otherwise, the system 10 remains as it was in the resting state.

After the ignition 20 has been turned on, the light activating switch 22 of the bus 12 is actuated, thereby turning on the lights 15 of the bus 12. At this point, the system 10 moves into the latching state, depicted in FIG. 4. In the latching state, there remains a current flow through coil 38 as relay 26 remains in the same state as in stand-by state.

In the latching state, current flows from the light activating switch 22 along wire 62, through diode 32 to wire 64. From there, the current will flow through coil 44 of relay 28 to wire 66 and then through points 52a and 54 of relay 30 to wire 68 to wire 58 to ground 60. In this manner, points 46b and 48 of relay 28 close. The system is thus energized and can be put into armed mode from this point.

Figure 5:
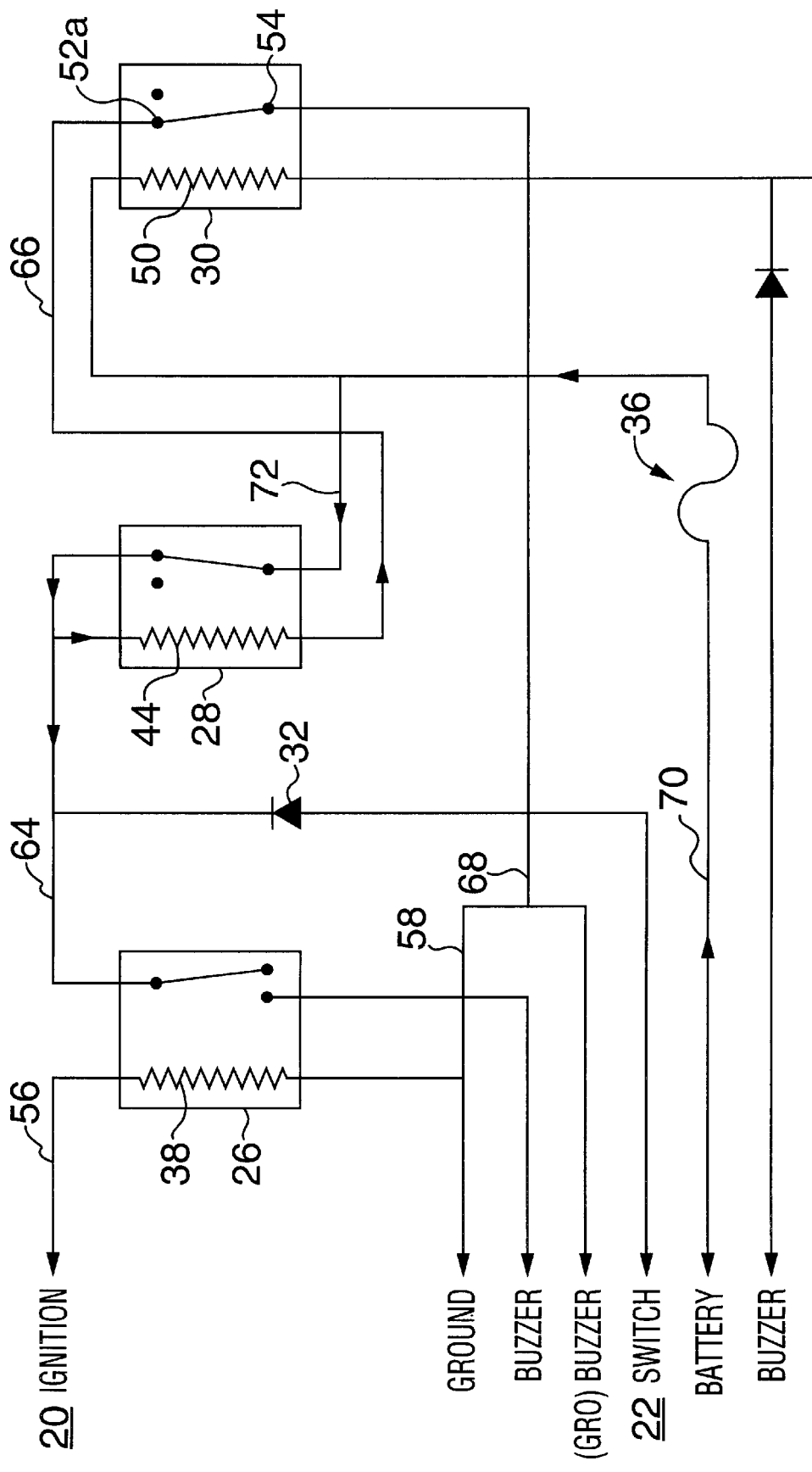
FIG. 5 is a schematic diagram of the alarm system circuitry of the present invention in the armed state.

The armed state of the system 10 is depicted in FIG. 5. In this state, both relay 26 and relay 30 remain as they were in the previous state. However, the light activating switch 22 has now been turned off so that there is no longer any current flow along wire 62. Rather current flows from battery 69, along wire 70, through fuse 36 to wire 72. From there, the current flows through closed points 46b and 48 and back through coil 44 of relay 28 to wire 66 and points 52a and 54 to ground. In this state, diode 32 blocks the current flow back to the light activating switch 22.

Figure 6:
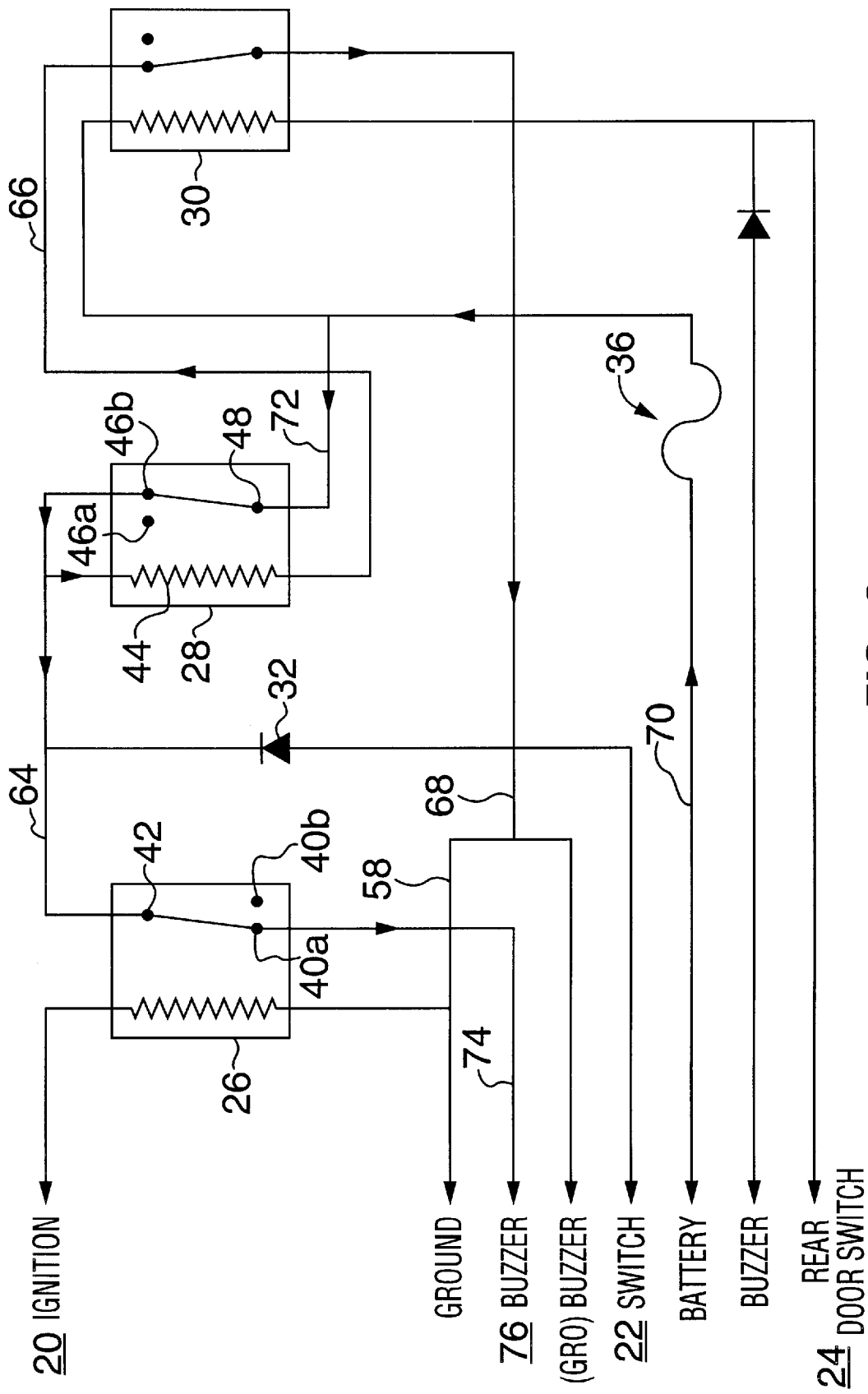
FIG. 6 is a schematic diagram of the alarm system circuitry of the present invention in the alarm state.

The alarm state of the system 10 is depicted in FIG. 6 and occurs when the ignition 20 is turned off, thereby interrupting the current flow through coil 38 and closing the circuit between points 40a and 42. The current flow thus follows wire 74 to activate the alarm signal, shown in the drawings as buzzer 76. While an audible signal has been used for illustrative purposes, it is also possible to use another signalling device that would be bring the alarm to the attention of the driver, such as flashing lights.

Figure 7:
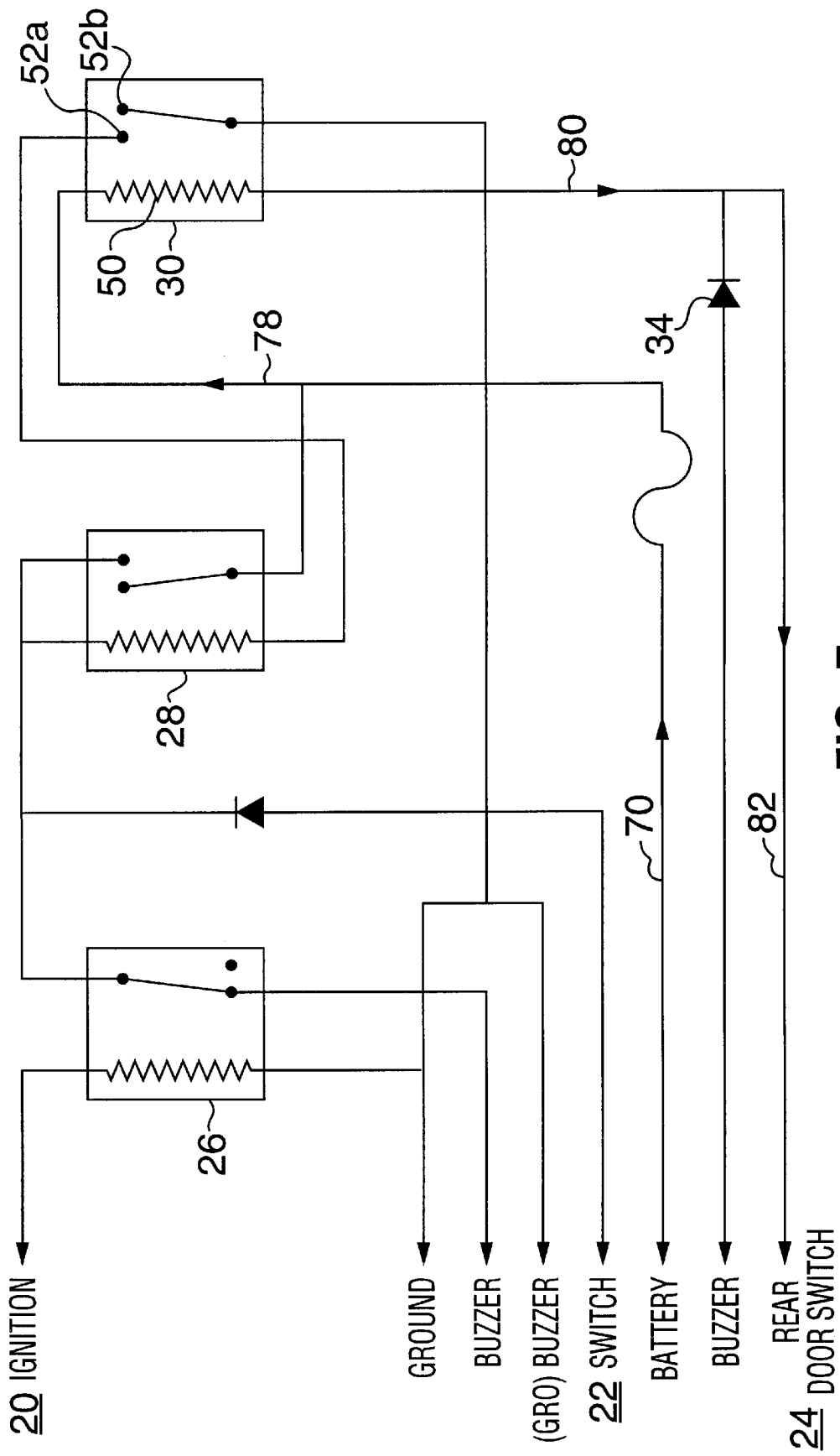
FIG. 7 is a schematic diagram of the alarm system circuitry of the present invention in the deactivated state.

Once in the alarm state, the system 10 will continue to sound the buzzer 76 until such time as the rear door switch 24 is activated creating a ground for the current flow along wire 78, through relay 30 to wire 80 and eventually wire 82. This circuit diagram of the deactivation state is depicted in FIG. 7. It can further be seen in this diagram that the diode 34 is in place to prevent the current of wire 80 from travelling to the buzzer 72. In addition, in the deactivation state, the circuit between points 52a and 54 of relay 30 is open so as to stop current flow through coil 44 of relay 28. Thus, relay 28 returns to the resting state as depicted in FIG. 2.

From the circuit diagram of FIG. 5, it can be seen that the system 10 may be deactivated when in the armed state (before buzzer 72 is sounding) as well as in the alarm state (with buzzer 72 sounding). In the armed state, if the rear door switch 24 is actuated, it will create a ground for relay 30 by wires 82, 80 as if the system 10 were in the alarm state. In this case, the system 10 will enter the deactivation state depicted in FIG. 7, with the exception that the ignition 20 is still on. This will effectively return the system 10 to the stand-by state depicted in FIG. 3.

Having now explained the manner in which the circuitry of the system 10 operates, it can readily be understood how the system 10 operates in practice as a reminder to the bus driver to perform the check for children left on the bus.

When the driver first turns on the ignition 20 at the start of a run, the system 10 is placed in stand-by state until the light activating switch 22 of the bus 12 is turned on. Once the light activating switch 22 of the bus 12 has been turned on and off, the system 10 passes through the latched state to the armed state. As those skilled in the art will appreciate, these steps are common to every bus trip and therefore, the system 10 does not require that any additional action be taken by the driver in order to be operational. Thus, the driver will complete the run with the system 10 in the armed state. Indeed, if the system 10 is turned off somewhere along the route, for example by a child playing with the rear door 18 or the rear door switch 24, the system 10 is automatically reset each time that the lights 15 of the bus 12 are turned on, which is normally the next time the bus 12 is stopped to accept to unload passengers.

At the end of the run, the driver returns to the yard and turns off the ignition 20. At this point, the system 10 immediately enters the alarm state and the alarm (buzzer 74) sounds. The only way for the driver to silence the alarm is to walk to the back 16 of the bus 12 and manually actuate the rear door switch 24, by opening and closing the rear door 18. In so doing, the driver may check the bus 12 for any children that may remain. In addition, because the system 10 tied to the rear door 18, the driver will be inspecting the rear door 18 to ensure that it is functioning properly, as recommended by the recent coroner's inquest in Ontario.

The present invention provides a very important option to the driver in the ability to deactivate the system 10 with the ignition 20 running. At the end of the run, the bus 12 is often many miles from the bus yard. Therefore, it would be inefficient for the driver to return to the yard and then perform the check for children. In fact, many drivers will perform the check en route to the yard so that if a child is still present on the bus, the driver does not have as far to drive to drop off the child. To accommodate this practice, the present invention allows the driver to deactivate the system 10 with the ignition 20 running. Thus, the driver can perform the check at the school or en route to the yard by stopping the bus, walking to the back 16 of the bus 12 to perform the required check and, having done so, deactivating the system 10 by actuating the rear door switch 24. The driver can then proceed to the yard with the knowledge that there are no children left on the bus.

If the driver were to perform this same task en route but was required to turn off the ignition 20, the alarm would sound. The ignition 20 could be turned back on silencing the alarm and putting the system in the armed state again. Then, when the driver arrives at the yard and turns the ignition 20 off, the alarm would sound again, requiring the driver to walk to the back 16 of the bus 12 to manually deactivate the system 10.

It may also be necessary for the driver to deactivate the buzzer 72 without disabling the system 10, for example in a situation where the ignition of the bus has to be turned off temporarily to deal with a problem on or around the bus. In such circumstances, it is desirable to disable the buzzer 72 without necessarily disabling the entire system 10. This can be accomplished turning the key to the accessory position on the ignition switch, rather than removing the key altogether. In this position, the system 20 remains in the armed state and when the ignition is turned back on the system is still in the armed state. Thus, with this system 10 the ignition can be turned off, the buzzer will sound and must be deactivated with the rear door switch.

While the invention has been described in association with a school bus, it could readily be used on any multi-passenger vehicle which could benefit from this sort of reminder system and which provided a switch means remote from the driver's location.

Thus, it is apparent that there has been provided in accordance with the invention an alarm system for use on a bus that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privelege is claimed are defined as follows:

1. An alarm system to remind a driver to inspect a bus for remaining passengers, the bus having an ignition switch with an on and an off position, the alarm system comprising:
    an electrical circuit arranged to effect a resting state in which the alarm system is unpowered and inoperable, a stand-by state when the ignition is in the on position, an armed state in which the alarm system is activated, and a disarmed state in which the alarm system is deactivated but energized such that the system can be returned to the armed state, whereby the disarmed state can be achieved with the ignition in the on position;
    an alarm to indicate an alarm state; and
    a deactivation switch positioned at a rear of the bus to remove the alarm system from the armed state or the alarm state.

2. The alarm system of claim 1 wherein the bus has a rear door and the deactivation switch is arranged so as to remove the alarm system from the armed state or the alarm state upon opening the rear door.

3. The alarm system of claim 1 wherein the deactivation switch comprises a rear door switch.

4. The alarm system of claim 1 wherein the electric circuit comprises a plurality of electromechanical relays.

5. The alarm system of claim 1 wherein the electric circuit further comprises a latching state from which the system may be armed.

6. The alarm system of claim 5 wherein the bus includes a light activating switch and the latching state is achieved by activating the light activating switch.

7. The alarm system of claim 5 wherein the electric circuit comprises at least a first, a second and a third electromechanical circuit, the first electromechanical circuit being activated in the stand-by state, the first and second electromechanical circuits being activated in the latching state and the armed state, the second electromechanical circuit being activated in the alarm state, and the third electromechanical circuit being activated in the deactivated state.

8. The alarm system of claim 1 wherein the bus includes a light activating switch and the armed state is achieved by deactivating the light activating switch.

9. The alarm system of claim 1 wherein the alarm comprises an audible signal.

10. The alarm system of claim 1 wherein the alarm is activated by turning the ignition to the off position while the alarm system is in the armed state.

11. An alarm system to remind a driver to inspect a bus for remaining passengers, the bus having an ignition switch with an on and an off position and a light activating switch, the alarm system comprising:
    circuit means for effecting an armed state when the ignition is in the on position and the light activating switch has been turned on and off, and a disarmed state that can be effected with the ignition in the on position, the alarm system being energized in the disarmed state such that the alarm system can be returned to the armed state, and an alarm state;
    an alarm to indicate the alarm state; and
    a deactivation switch positioned at a rear of the bus to remove the alarm system from the armed state or the alarm state.

12. A method of reminding a driver to inspect a bus for remaining passengers, the bus having an ignition switch with an on and an off position and a light activating switch, the method comprising the steps of
    placing the alarm system into an armed state by activating and deactivating the light activating switch while the ignition switch is in the on position; and
    removing the alarm system from the armed state to a disarmed state by activating a switch positioned at a rear of the bus while the ignition is the on position, the alarm system being energized in the disarmed state such that the alarm system can be returned to the armed state.

13. The method of claim 12 wherein the step of removing the alarm system from the armed state comprises the step of opening a rear door on the bus.

14. The method of claim 12 wherein an alarm state is achieved by turning the ignition to the off position while the alarm system is in the armed state.

* * * * *